(12) United States Patent
Danhamer et al.

(10) Patent No.: US 8,172,196 B2
(45) Date of Patent: May 8, 2012

(54) SUPPORTING DEVICE FOR A MOBILE COLORIMETER

(75) Inventors: Bernd Danhamer, Niederweningen (CH); Stefan Diethelm, Staefa (CH)

(73) Assignee: X-Rite Europe GmbH, Regensdorf (CH)

( * ) Notice: Subject to any disclaimer, the term of this patent is extended or adjusted under 35 U.S.C. 154(b) by 275 days.

(21) Appl. No.: 12/276,806

(22) Filed: Nov. 24, 2008

(65) Prior Publication Data

US 2009/0140018 A1 Jun. 4, 2009

(30) Foreign Application Priority Data

Dec. 3, 2007 (EP) .................................... 07122107

(51) Int. Cl.
*F16M 11/00* (2006.01)
(52) U.S. Cl. .................. 248/682; 356/402; 356/405
(58) Field of Classification Search .............. 24/3.1, 24/3.4, 3.7, 3.9; 248/682; 356/402; 405/180, 405/185, 186; 482/79, 93, 105; 359/880
See application file for complete search history.

(56) References Cited

U.S. PATENT DOCUMENTS

| | | | | | |
|---|---|---|---|---|---|
| 2,117,403 | A | * | 5/1938 | Crosby | 359/880 |
| 2,327,096 | A | * | 8/1943 | Dann | 359/880 |
| 4,979,339 | A | * | 12/1990 | Jones et al. | 52/3 |
| 5,388,274 | A | * | 2/1995 | Glover et al. | 2/338 |
| D383,620 | S | * | 9/1997 | Smith et al. | D6/407 |
| 5,690,595 | A | * | 11/1997 | Quinones | 482/124 |
| 5,797,823 | A | * | 8/1998 | Gouvis, II | 482/105 |
| 6,030,085 | A | * | 2/2000 | Leam et al. | 359/871 |
| 6,099,133 | A | * | 8/2000 | Wright | 359/880 |
| 6,200,243 | B1 | * | 3/2001 | Meranto | 482/105 |
| 6,216,319 | B1 | * | 4/2001 | Elkins | 24/3.2 |
| D444,934 | S | * | 7/2001 | Ross | D2/861 |
| D485,834 | S | * | 1/2004 | Davetas | D14/250 |
| 6,907,645 | B2 | * | 6/2005 | Jenson et al. | 24/599.6 |
| D517,364 | S | * | 3/2006 | Nieves | D6/633 |

(Continued)

FOREIGN PATENT DOCUMENTS

GB 917360 2/1963

OTHER PUBLICATIONS

Gretagmacbeth product literature, Spectrolino™ Spectrophotometer, The Handheld System That Scores High in Color Measurement Precision, 4 pages, Mar. 1998.

(Continued)

*Primary Examiner* — Terrell McKinnon
*Assistant Examiner* — Daniel J Breslin
(74) *Attorney, Agent, or Firm* — McCarter & English, LLP

(57) ABSTRACT

A device for supporting a mobile calorimeter on a measuring object, especially a monitor, includes a flexible tube-shaped carrying belt (G) which is at least partially filled with a granular loading material and which is provided with a fixing member (1) for its installation on the calorimeter (MD). The supporting device may further include a pocket (T) provided with measuring and operating apertures for receiving the mobile calorimeter (MD), and the carrying belt (G) may be fastened to the pocket (T). The carrying belt (G) may be formed substantially as a closed loop and may be provided with a Velcro fastener for its lengthwise adjustment. The supporting device permits easy and comfortable positioning of the measuring apparatus on a monitor and at the same time serves as a carrying belt.

18 Claims, 1 Drawing Sheet

U.S. PATENT DOCUMENTS

| | | | |
|---|---|---|---|
| 7,064,831 B2 | 6/2006 | Lutz et al. | |
| 7,133,133 B2 * | 11/2006 | Merle et al. | 356/402 |
| 7,391,514 B2 * | 6/2008 | Merle et al. | 356/405 |
| 7,871,052 B2 * | 1/2011 | Baum | 248/505 |
| 2003/0058448 A1 | 3/2003 | Merle | |
| 2004/0080749 A1 * | 4/2004 | Lutz et al. | 356/405 |
| 2004/0263847 A1 * | 12/2004 | Merle et al. | 356/402 |
| 2006/0150537 A1 * | 7/2006 | Baum et al. | 52/90.1 |
| 2007/0099774 A1 * | 5/2007 | Bruback | 482/105 |
| 2008/0019777 A1 * | 1/2008 | Carney | 405/186 |

OTHER PUBLICATIONS

European Search Report dated Apr. 17, 2008.

* cited by examiner

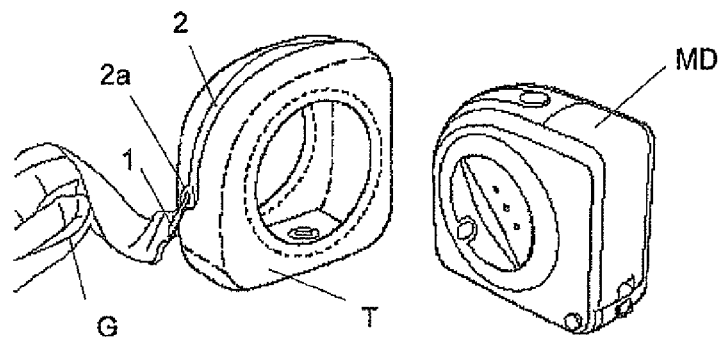
Fig. 1
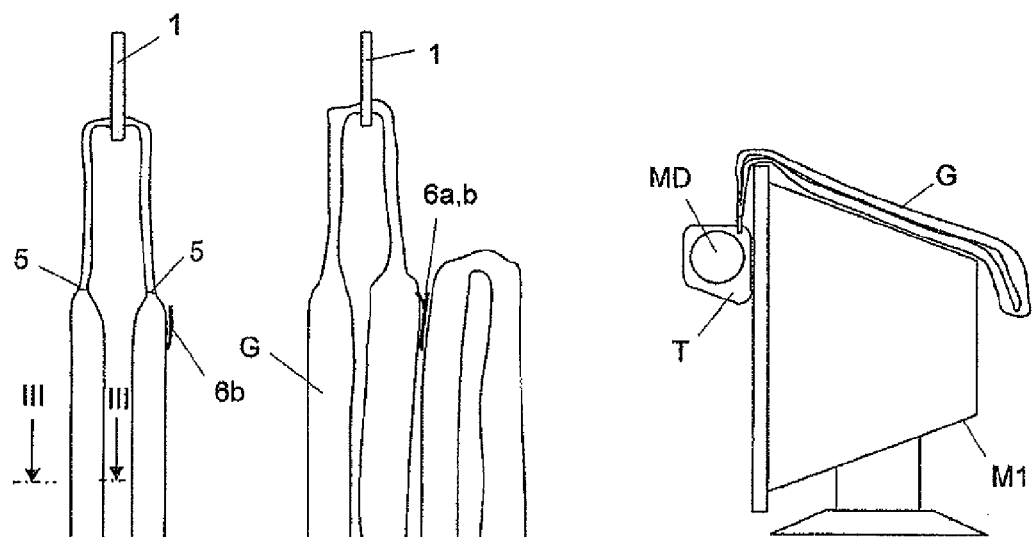
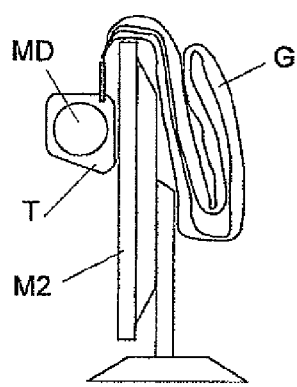
Fig. 5
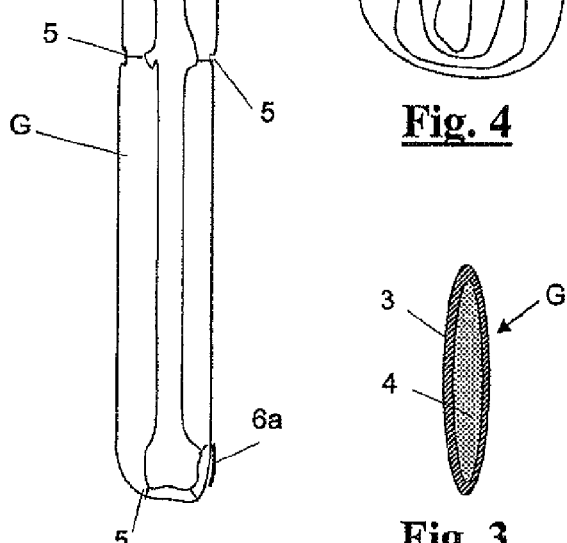
Fig. 2
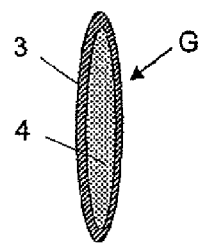
Fig. 3
Fig. 6

SUPPORTING DEVICE FOR A MOBILE COLORIMETER

FIELD OF THE INVENTION

The invention concerns a device for supporting a mobile calorimeter on a test object, especially a monitor.

TECHNICAL BACKGROUND

Today mobile calorimeters are preferably employed in order to measure and calibrate colour monitors or similar apparatus. Examples of these types of devices are the apparatus ColorMunki and Spectrolino available from X-Rite Europe AG, Regensdorf, Switzerland.

Positioning and supporting of the calorimeter on the illuminating surface of the monitor, which is usually vertical or strongly inclined, is accompanied by certain difficulties. On the one hand, the colorimeter has to be securely fixed at its position and on the other hand, it should also allow for quick and easy displacement to other measuring points on the monitor.

According to the document U.S. Pat. No. 7,064,831 B2, the calorimeter is suspended in front of the monitor on its power supply cable. The cable is laid over the monitor and is provided with an adjustable weight fixing the cable and the calorimeter suspended thereon. Of course this solution is not appropriate for cordless colorimeters.

Further, it is already known to position colorimeters by means of one or more suction cups on the monitor to be measured. However, this solution is not suitable for many application purposes, in particular because the precise adjustment to the measuring point is difficult and a potential change to another measuring point in this way is relatively complicated and time consuming. Further, since relatively strong suction forces acting on the monitor are required, this solution often meets with dislike.

SUMMARY OF THE INVENTION

Starting from this prior art, it is an object of the present invention to provide a device for supporting a mobile calorimeter on a test object, especially a monitor, which enables an easy and comfortable positioning of the calorimeter and which is suitable also for cordless calorimeters. Further, only relatively small forces acting on the monitor shall be required.

This object is advantageously achieved by the constructive measures described herein. In particular, the present disclosure advantageously provides a device for supporting a mobile calorimeter on a measuring object, especially on a monitor, characterized by a flexible tube-like carrying belt which is at least partially filled with a loading material and which is provided with a fixing member for its installation on the calorimeter. Additional features, functions and advantages of the disclosed device will be apparent from the detailed description which follows, particularly when read in conjunction with the accompanying figures.

BRIEF DESCRIPTION OF THE DRAWINGS

An exemplary embodiment of the supporting device according to the invention is explained in more detail based on the appended drawings, wherein:

FIG. 1 shows a supporting device together with a mobile calorimeter;

FIG. 2 shows the carrying belt of the supporting device in a lateral view;

FIG. 3 shows a slightly enlarged sectional view through the carrying belt along a line III-III of FIG. 2;

FIG. 4 shows the carrying belt of the supporting device in a shortened condition; and FIGS. 5-6 show the supporting device in its practical application on different monitors.

DESCRIPTION OF EXEMPLARY EMBODIMENTS

The illustrated, exemplary supporting device according to the invention includes both a pocket "T" for receiving one of the mobile calorimeters "MD" illustrated separately in the figure and a substantially flexible carrying belt "G" secured to the pocket "T" by means of a bow-shaped or hook-shaped fixing member 1. The pocket T is provided with various operating and measuring apertures which allow access to the operating elements of the calorimeter and through which the measuring operation is performed. The pocket T includes a zipper 2 having a movable closure 2a, such that the calorimeter MD may be comfortably put into and taken out of the pocket, respectively. The fixing member 1 of the carrying belt is hung up in the closure 2a of the zipper. The fixing member 1 may be an appropriately shaped wire bow and may also present, for example, a spring hook, such that the carrying belt G may easily be detached from the pocket T if necessary.

In an alternative embodiment, no pocket is provided and the carrying belt G is fastened or may be fastened directly to an eye or the like on the calorimeter MD by means of its fixing member 1.

The carrying belt G which is shown only partially in FIG. 1 is illustrated in FIGS. 2-4 in more detail. The exemplary carrying belt G is shaped substantially in the form of a tube and preferably consists of synthetic tissue/material 3 as it is used for the manufacturing of carrying belts and tension belts. Preferably, the carrying belt G is formed into a closed loop as shown in FIG. 2. The carrying belt G is filled with a preferably flowable loading material over the most part of its length, wherein the loading material 4, in comparison with the pure belt material, exerts an increased own weight on the carrying belt G (FIG. 3). For the loading material 4, for example, sand or any other granular material having a relatively high specific weight is employed. Alternatively, also a liquid or gel-like loading material may be employed, for example, water or an appropriate gel in one or more liquid-tight bags. The filling degree of the carrying belt is selected such that the carrying belt G is still sufficiently flexible. Various fragmentations (darts) 5 in the carrying belt T ensure that the loading material 4 is not undesirably displaced and that the carrying belt G maintains its elongated shape. At the same time, the fragmentations (darts) 5 form defined folding points and bending points, respectively, for the carrying belt G.

FIG. 5 shows an exemplary supporting device in its practical application to a CRT monitor M1. Here the calorimeter MD inserted in the pocket T is arranged at the interesting measuring point on the illuminating surface of the monitor M1 and the carrying belt G is laid over the monitor such that the calorimeter MD is suspended on the carrying belt G. Since the carrying belt G has an increased weight due to the presence of the loading material, it remains sufficiently stationary with respect to the monitor and thus can secure the calorimeter at its position. However, at the same time, the calorimeter may easily and comfortably be put onto another measuring point of the monitor. Of course, the weight of the carrying belt G has to be adjusted to that of the colorimeter MD in order to allow a sufficient balance. The carrying belt may present on its surface an increased roughness (friction coefficient), for example, by means of a rip-like or rib-like structure. Alternatively or additionally, the carrying belt may be provided at least partially with a rubber coating which increases the friction force between the carrying belt and the supporting areas on the monitor.

Depending on the size of the monitor or generally of the measuring object on which the calorimeter is employed, the length of the carrying belt G may influence ease of use and/or effectiveness of deployment. In view of such cases of application, the carrying belt G may be provided with a lengthwise adjustability. For this purpose, exemplary carrying belts are provided with two complementary pieces 6a and 6b of a Velcro fastener and, as shown in FIG. 4, the carrying belt may be folded up and fixed by means of the Velcro fastener in the folded position. Of course, instead of the exemplary Velcro fasteners disclosed herein, alternative fastening means may be employed according to the present disclosure, for example, buttons or the like may be provided.

FIG. 6 shows an exemplary supporting device in its practical application to a flat screen in a condition shortened and folded up, respectively, as explained above. If the carrying belt G is shortened, it does not press on the footprint of the monitor such that its effective counter weight with respect to the calorimeter is not reduced.

The supporting device according to the invention meets two functions. On the one hand, it allows an easy positioning of a mobile colorimeter on a measuring object and, on the other hand, it serves at the same time as a carrying belt for the apparatus, and especially in combination with the pocket, also as a protection for the calorimeter. Further, it can be handled easily and comfortably and it is space-saving.

Although the present invention has been described with reference to exemplary embodiments thereof, the present invention is not limited by or to such exemplary embodiments. Rather, the disclosed invention is susceptible to various modification, variations and/or implementations without departing from the spirit or scope of the present disclosure.

The invention claimed is:

1. A device comprising:
a flexible tube-like carrying belt adapted for supporting a mobile colorimeter on an object to be measured, the flexible tube-like carrying belt including a fixing member, wherein said fixing member is configured to be detachably secured relative to a pocket within which the mobile colorimeter is positioned, wherein the belt is at least partially filled with a loading material, and wherein the loading material is configured to balance the flexible tube-like carrying belt, thereby enabling the mobile colorimeter to be supported on the object to be measured.

2. The device according to claim 1, wherein said carrying belt is formed substantially as a closed loop.

3. The device according to claim 1, wherein said carrying belt is provided with means for its lengthwise adjustment.

4. The device according to claim 3, wherein said means for its lengthwise adjustment is formed as a Velcro fastener.

5. The device according to claim 1, wherein said carrying belt is filled with a flowable material.

6. The device according to claim 5, wherein said flowable material includes sand.

7. The device according to claim 1, wherein said carrying belt is at least partially formed as a tube made of synthetic material and filled with a gel.

8. The device according to claim 1, wherein said carrying belt is equipped at least partially with a surface providing an increased friction force.

9. The device according to claim 8, wherein the surface with said increased friction force includes a rubber coating.

10. The device according to claim 1, wherein the flexible tube-like carrying belt comprises fragments which form defined folding points and bending points.

11. A device comprising:
a flexible tube-like carrying belt adapted for supporting a mobile colorimeter on an object to be measured, the flexible tube-like carrying belt including a fixing member, wherein said fixing member is configured to be detachably secured relative to the mobile colorimeter, wherein the belt is at least partially filled with a loading material, further comprising a pocket provided with measuring and operating apertures for receiving the mobile colorimeter, wherein said carrying belt is fastened to said pocket.

12. The device according to claim 11, wherein said pocket is provided with a zipper, and wherein said carrying belt is fastened to a closure of said zipper.

13. The device according to claim 1, wherein the measuring object is a monitor.

14. The device according to claim 1, wherein the fixing member is bow-shaped or hook-shaped.

15. The device according to claim 1, wherein the fixing member defines a spring hook.

16. The device according to claim 1, wherein the flexible tube-like carrying belt includes at least one fragmentation to facilitate folding or bending thereof.

17. In combination:
(a) a flexible tube-like carrying belt which is at least partially filled with a loading material, the tube-like carrying belt including a fixing member, and
(b) a mobile colorimeter;
wherein the fixing member is detachably secured relative to a pocket within which the mobile colorimeter is positioned; and
wherein the mobile colorimeter positioned within the pocket can be arranged on an object to be measured.

18. The combination of claim 17, wherein the pocket includes a zipper and the fixing member is detachably secured with respect to the pocket through interaction with the zipper.

* * * * *